(12) United States Patent
Rafalovich et al.

(10) Patent No.: US 6,817,195 B2
(45) Date of Patent: Nov. 16, 2004

(54) REDUCED ENERGY REFRIGERATOR DEFROST METHOD AND APPARATUS

(75) Inventors: Alexander Rafalovich, Louisville, KY (US); Ziqiang Hu, Prospect, KY (US); Anil Kumar Tummala, Louisville, KY (US); Richard DeVos, Goshen, KY (US)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 10/113,892

(22) Filed: Mar. 29, 2002

(65) Prior Publication Data

US 2003/0182951 A1 Oct. 2, 2003

(51) Int. Cl.[7] .............................................. F25D 21/06
(52) U.S. Cl. .............................. 62/155; 62/276; 62/277
(58) Field of Search ......................... 62/151, 153, 155, 62/156, 234, 275, 276

(56) References Cited

U.S. PATENT DOCUMENTS

| | | | |
|---|---|---|---|
| 2,492,970 A | * | 1/1950 | Curry ........................... 62/155 |
| 4,358,933 A | | 11/1982 | Horvay |
| 4,528,821 A | | 7/1985 | Tershak et al. |
| 4,530,217 A | * | 7/1985 | Alluto et al. .................. 62/156 |
| 4,646,536 A | * | 3/1987 | Yamada et al. ............... 62/234 |
| 5,669,222 A | | 9/1997 | Jaster et al. |
| 5,842,355 A | | 12/1998 | Kalis et al. |
| 5,924,297 A | * | 7/1999 | Wolff et al. ................... 62/152 |
| 6,032,471 A | | 3/2000 | Choi |

\* cited by examiner

*Primary Examiner*—Harry B. Tanner
(74) *Attorney, Agent, or Firm*—H. Neil Houser, Esq.; Armstrong Teasdale LLP

(57) ABSTRACT

An apparatus and method for defrosting an evaporator of a refrigeration sealed system is described. The system includes a controller operatively coupled to an evaporator fan, a condenser fan and a defrost heater, and the method includes operating the sealed system until a selected time till defrost interval expires, initiating a defrost cycle when the time till defrost interval expires, and selectively operating the sealed system to raise a temperature of the evaporator while the defrost heater is inactivated.

15 Claims, 8 Drawing Sheets

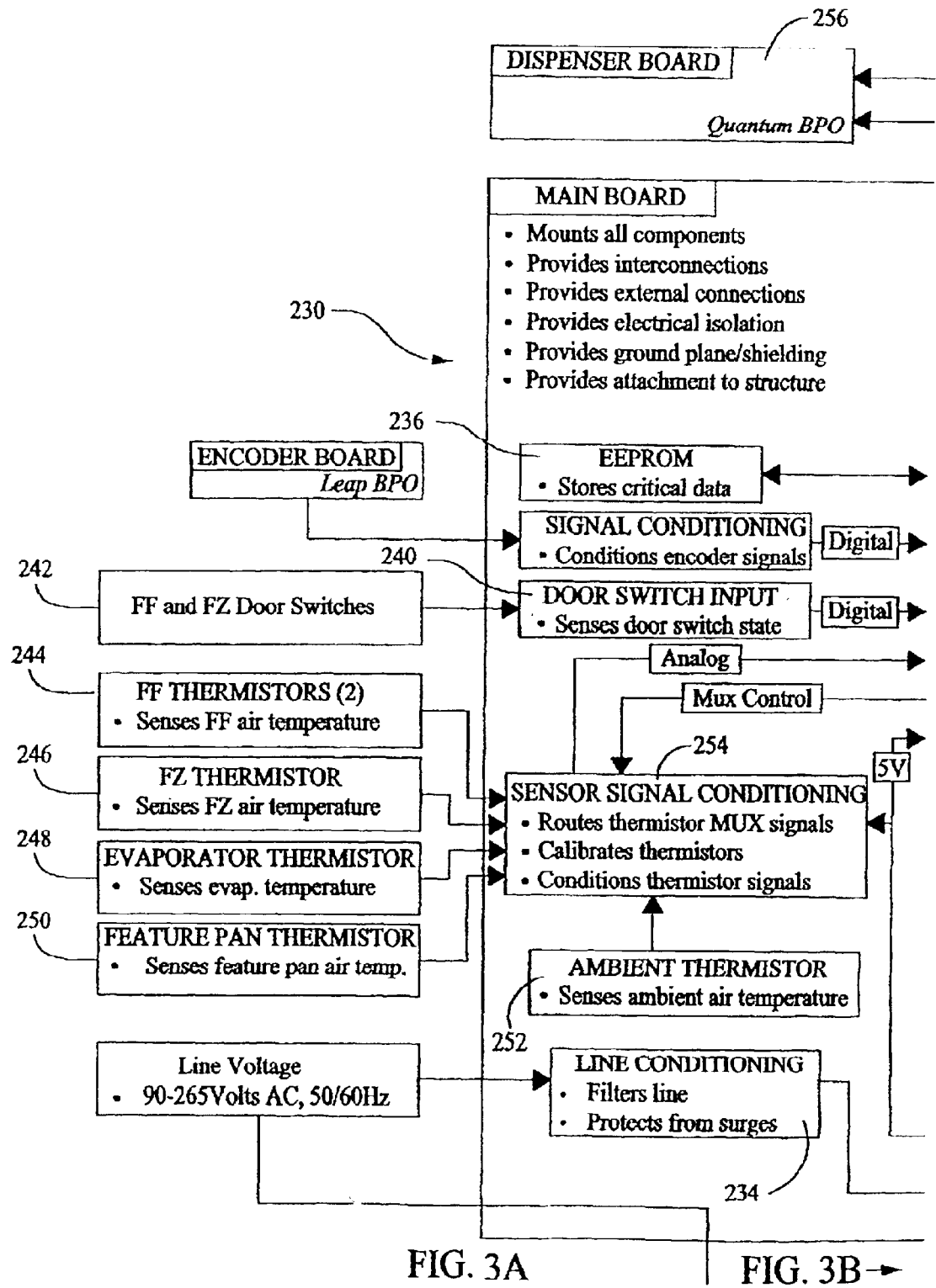
FIG. 3A | FIG. 3B →

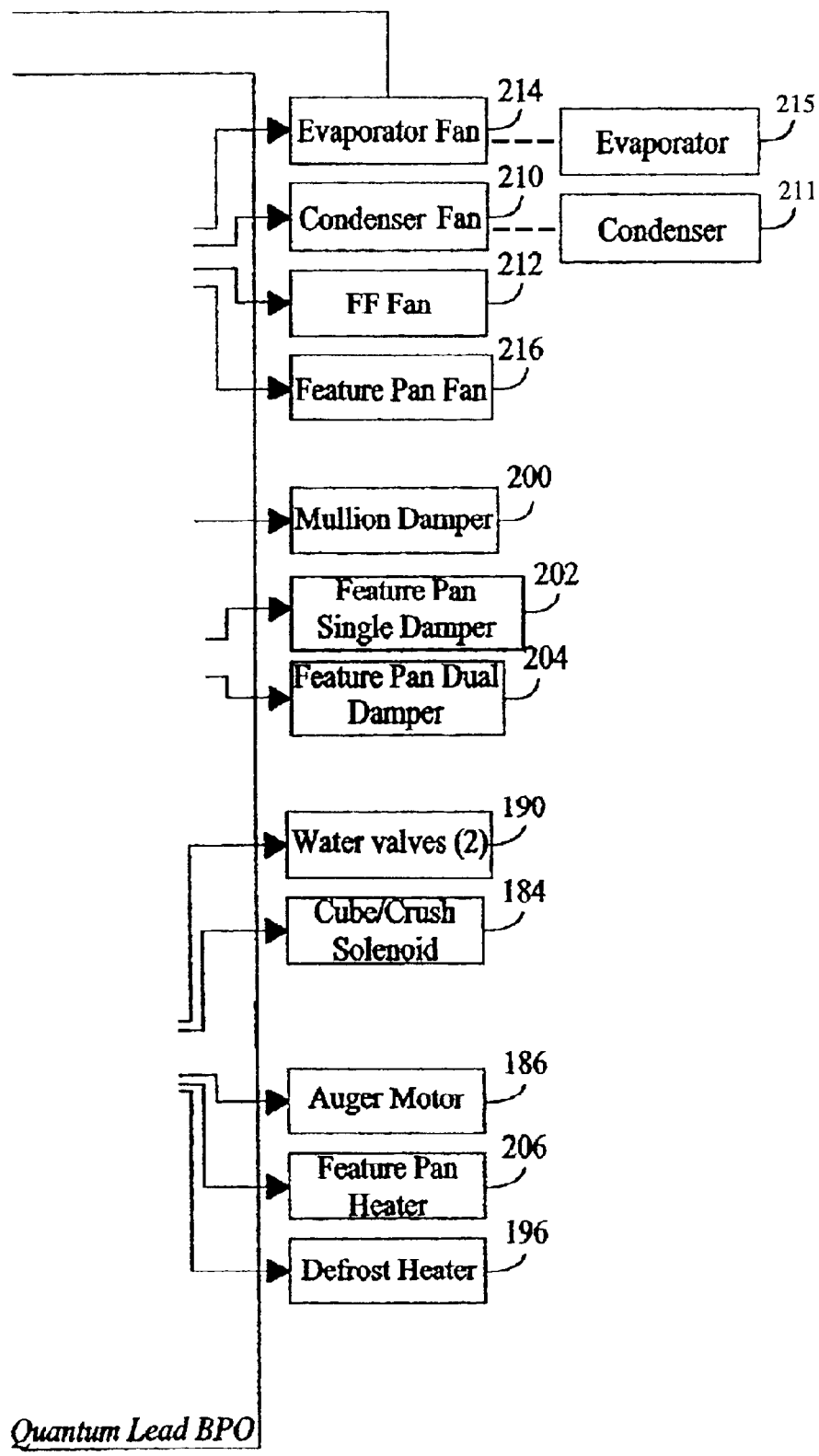
← FIG. 3B     FIG. 3C

REDUCED ENERGY REFRIGERATOR DEFROST METHOD AND APPARATUS

BACKGROUND OF THE INVENTION

This invention relates generally to refrigerators and, more particularly, to a method and apparatus for controlling refrigeration defrost cycles.

Known frost free refrigerators include a refrigeration defrost system to limit frost buildup on evaporator coils. Conventionally, an electromechanical timer is used to energize a defrost heater after a pre-determined run time of the refrigerator compressor to melt frost buildup on the evaporator coils. To prevent overheating of the freezer compartment during defrost operations when the heater is energized, in at least one type of defrost system the compartment is pre-chilled. After defrost, the compressor is typically run for a predetermined time to lower the evaporator temperature and prevent food spoilage in the refrigerator and/or fresh food compartments of a refrigeration appliance.

Such timer-based defrost systems, however are not as energy efficient as desired. For instance, they tend to operate regardless of whether ice or frost is initially present, and they often pre-chill the freezer compartment regardless of initial compartment temperature. In addition, the defrost heater is typically energized without temperature regulation in the freezer compartment, and the compressor typically runs after a defrost cycle regardless of the compartment temperature. Such open loop defrost control systems, and the accompanying inefficiencies are undesirable in light of increasing energy efficiency requirements.

Recognizing the limitations of such timer-based defrost systems, efforts have been made to provide adaptive defrost systems employing limited feedback, such as door openings and compressor and evaporator conditions, for improved energy efficiency of defrost cycles. As such, unnecessary defrost cycles are avoided and the defrost heater is cycled on and only as necessary, such as until the evaporator reaches a fixed termination temperature. See, for example, U.S. Pat. No. 4,528,821. However, achieving some defrost goals, such as melting all of the frost off of the evaporator, are detrimental to achieving other defrost goals, such as maintaining freezer compartment temperatures at sufficient levels during defrost operations to prevent freezer burn and moisture formation/ice buildup in the freezer compartment. Known defrost systems have not resolved these difficulties in an energy efficient manner.

BRIEF DESCRIPTION OF THE INVENTION

In one aspect, a method for defrosting an evaporator of a refrigeration sealed system is provided. The system includes a controller operatively coupled to an evaporator fan, a condenser fan and a defrost heater, and the method comprises operating the sealed system until a selected time till defrost interval expires, initiating a defrost cycle when the time till defrost interval expires, and selectively operating the sealed system to raise a temperature of the evaporator while the defrost heater is inactivated.

In another aspect, a method for defrosting an evaporator of a refrigeration sealed system is provided. The system includes at least one refrigeration compartment and a controller operatively coupled to a compressor, an evaporator fan and a condenser fan. The method comprises initiating a defrost cycle, operating the sealed system to prechill the refrigeration compartment, and selectively operating the evaporator fan and the condenser fan to raise a temperature of the evaporator.

In another aspect, a method for defrosting a refrigeration appliance is provided. The appliance includes a freezer compartment and a sealed system including a controller and a compressor, an evaporator, a condenser, an evaporator fan and a condenser fan operatively coupled thereto. The method utilizes a defrost heater, and the method comprises operating the sealed system until a selected time till defrost expires, initiating a defrost cycle when the time till defrost expires, operating the sealed system to prechill the refrigeration compartment, selectively operating the sealed system to raise a temperature of the evaporator, and energizing the defrost heater after selectively operating the sealed system to raise a temperature of the evaporator.

In another aspect, a refrigeration unit is provided. The refrigeration unit comprises a compressor, an evaporator fan, a condenser fan, and a controller operatively coupled to said compressor, said evaporator fan and said condenser fan. The controller is configured to deactivate said compressor and selectively operate at least one of said evaporator fan and said compressor fan to raise a temperature of the evaporator when a defrost cycle is initiated.

In another aspect, a refrigeration unit is provided. The refrigeration unit comprises a compressor, an evaporator, a condenser fan, a defrost heater, and a controller. The controller is operatively coupled to said compressor, said evaporator and said defrost heater, and the controller comprises a defrost timer. The controller is configured to operate said compressor in a normal mode and an abnormal load in response to a value of the defrost timer, and said controller is further configured to selectively operate at least one of said evaporator fan and said condenser fan when said time till defrost expires to raise a temperature of the evaporator before energizing said defrost heater.

In another aspect, a refrigerator is provided. The refrigerator comprises a cabinet defining at least one refrigeration compartment, and a sealed system for cooling said at least one refrigeration compartment. The sealed system comprises an evaporator, a defrost heater; and a controller operatively coupled to said sealed system and to the defrost heater. The controller is configured to adaptively control said defrost heater and said sealed system between normal and abnormal time till time till defrost intervals, and when a time till time till defrost interval has expired, said controller is configured to operate said sealed system to prechill said refrigeration compartment and to thereafter selectively operate said sealed system to raise a temperature of said evaporator without energizing said defrost heater.

DETAILED DESCRIPTION OF THE INVENTION

Figure 1:
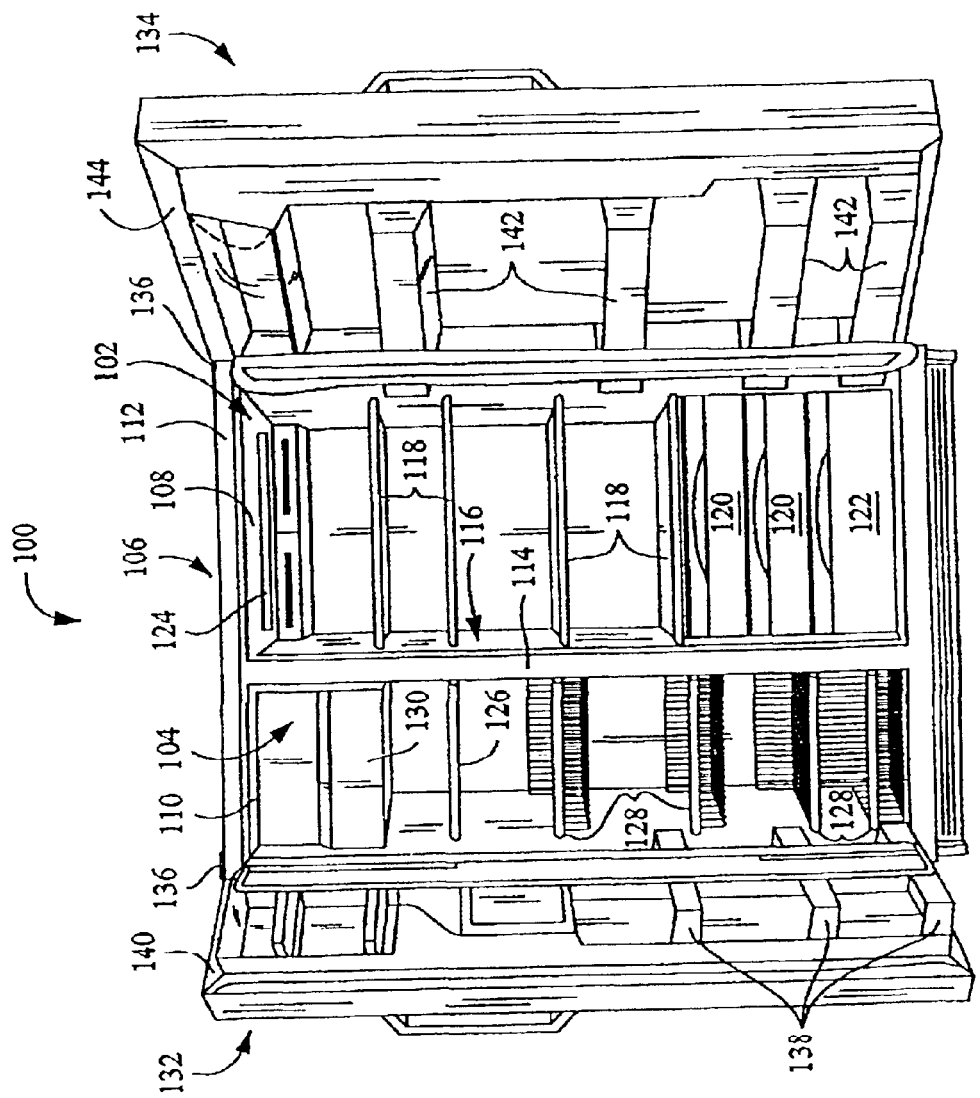
FIG. 1 is a perspective view of a refrigerator.

FIG. 1 illustrates a side-by-side refrigerator 100 in which the present invention may be practiced. It is recognized, however, that the benefits of the present invention apply to other types of appliances including single or multiple compartment refrigerators, single or multiple compartment freezers, combination refrigerator and freezers (including top mount systems), and other refrigeration devices, including but not limited to climate control systems, water coolers, wine coolers, ice makers, and vending machines having similar control issues and considerations. Consequently, the description set forth herein is for illustrative purposes only and is not intended to limit the invention in any aspect.

Refrigerator 100 includes a fresh food storage compartment 102 and a freezer storage compartment 104. Freezer compartment 104 and fresh food compartment 102 are arranged side-by-side in an outer case 106 with inner liners 108 and 110. A space between case 106 and liners 108 and 110, and between liners 108 and 110, is filled with foamed-in-place insulation or other known insulation material applied according to known techniques. Outer case 106 normally is formed by folding a sheet of a suitable material, such as pre-painted steel, into an inverted U-shape to form top and side walls of case. A bottom wall of case 106 normally is formed separately and attached to the case side walls and to a bottom frame that provides support for refrigerator 100.

Inner liners 108 and 110 are molded from a suitable plastic material to form freezer compartment 104 and fresh food compartment 102, respectively. Alternatively, liners 108, 110 may be formed by bending and welding a sheet of a suitable metal, such as steel. The illustrative embodiment includes two separate liners 108, 110 as it is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of liners. Breaker strip 112 is formed from a suitable resilient material, such as an extruded acrylo-butadiene-styrene based material (commonly referred to as ABS).

The insulation in the space between liners 108, 110 is covered by another strip of suitable resilient material, which also commonly is referred to as a mullion 114. Mullion 114 also preferably is formed of an extruded ABS material. It will be understood that in a refrigerator with separate mullion dividing a unitary liner into a freezer and a fresh food compartment, a front face member of mullion corresponds to mullion 114. Breaker strip 112 and mullion 114 form a front face, and extend completely around inner peripheral edges of case 106 and vertically between liners 108, 110. Mullion 114, insulation between compartments 102, 104, and a spaced wall of liners 108, 110 separating compartments 102, 104 sometimes are collectively referred to herein as a center mullion wall 116.

Shelves 118 and slide-out drawers 120 normally are provided in fresh food compartment 102 to support items being stored therein. A bottom drawer or pan 122 partly forms a quick chill and thaw system (not shown) and selectively controlled, together with other refrigerator features, by a microprocessor (not shown in FIG. 1) according to user preference via manipulation of a control interface 124 mounted in an upper region of fresh food storage compartment 102 and coupled to the microprocessor. A shelf 126 and wire baskets 128 are also provided in freezer compartment 104. In addition, an ice maker 130 may be provided in freezer compartment 104.

A freezer door 132 and a fresh food door 134 close access openings to fresh food and freezer compartments 102, 104, respectively. Each door 132, 134 is mounted by a top hinge 136 and a bottom hinge (not shown) to rotate about its outer vertical edge between an open position, as shown in FIG. 1, and a closed position (not shown) closing the associated storage compartment. Freezer door 132 includes a plurality of storage shelves 138 and a sealing gasket 140, and fresh food door 134 also includes a plurality of storage shelves 142 and a sealing gasket 144.

In accordance with known refrigerators, refrigerator 100 also includes a machinery compartment (not shown) that at least partially contains components for executing a known vapor compression cycle for cooling air inside fresh food compartment 102 and freezer compartment 104 by transferring heat from the inside of refrigerator 100 and rejecting the heat to the outside of refrigerator 100. The components include a compressor (not shown in FIG. 1), a condenser (not shown in FIG. 1), an expansion device (not shown in FIG. 1), and an evaporator (not shown in FIG. 1) connected in series and charged with a refrigerant. The evaporator is a type of heat exchanger which transfers heat from air passing over the evaporator to a refrigerant flowing through the evaporator, thereby causing the refrigerant to vaporize and cool the evaporator surface, while heat is rejected in the condenser. The cooled air is used to refrigerate one or more refrigerator or freezer compartments via fans (not shown in FIG. 1). Collectively, the vapor compression cycle components in a refrigeration circuit, associated fans (e.g. an evaporator fan and a condenser fan), and associated compartments are referred to herein as a sealed system. The construction of the sealed system is well known and therefore not described in detail herein, and the sealed system components are operable at varying speeds to force cold air through the refrigerator subject to the following control scheme.

Figure 2:
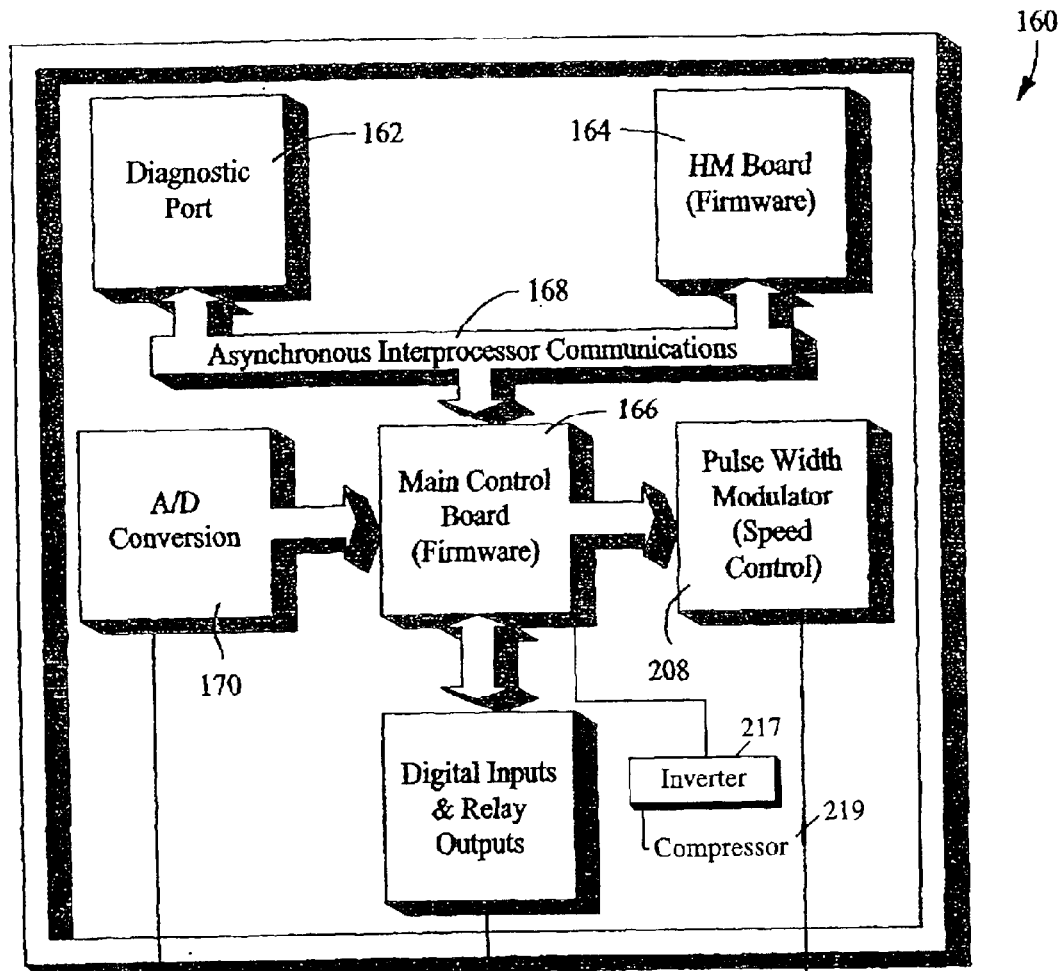
FIG. 2 is a block diagram of a refrigerator controller in accordance with one embodiment of the present invention.

FIG. 2 illustrates an exemplary controller 160 in accordance with one embodiment of the present invention. Controller 160 can be used, for example, in refrigerators, freezers and combinations thereof, such as, for example side-by-side refrigerator 100 (shown in FIG. 1).

Controller 160 includes a diagnostic port 162 and a human machine interface (HMI) board 164 coupled to a main control board 166 by an asynchronous interprocessor communications bus 168. An analog to digital converter ("A/D converter") 170 is coupled to main control board 166. A/D converter 170 converts analog signals from a plurality of sensors including one or more fresh food compartment temperature sensors 172, a quick chill/thaw feature pan (i.e., pan 122 shown in FIG. 1 or other temperature controlled compartment) temperature sensors 174, freezer temperature sensors 176, external temperature sensors (not shown in FIG. 2), and evaporator temperature sensors 178 into digital signals for processing by main control board 166.

In an alternative embodiment (not shown), A/D converter 170 digitizes other input functions (not shown), such as a power supply current and voltage, brownout detection, compressor cycle adjustment, analog time and delay inputs (both use based and sensor based) where the analog input is coupled to an auxiliary device (e.g., clock or finger pressure activated switch), sensing of the compressor sealed system components for diagnostics and power/energy optimization. Further input functions include external communication via IR detectors or sound detectors, HMI display dimming based on ambient light, adjustment of the refrigerator to react to food loading and changing the air flow/pressure accordingly to ensure food load cooling or heating as desired, and altitude adjustment to ensure even food load cooling and enhance pull-down rate at various altitudes by changing fan speed and varying air flow.

Digital input and relay outputs correspond to, but are not limited to, a condenser fan speed 180, an evaporator fan speed 182, a crusher solenoid 184, an auger motor 186, personality inputs 188, a water dispenser valve 190, encoders 192 for set points, a defrost heater 196, a door detector 198, a mullion damper 200, feature pan air handler dampers 202, 204, and a quick chill/thaw feature pan heater 206. Main control board 166 also is coupled to a pulse width modulator 208 for controlling the operating speed of a condenser fan 210 associated with a condenser 211, a fresh food compartment fan 212, an evaporator fan 214 associated with an evaporator 215, and a quick chill system feature pan fan 216. Additionally, main control board 166 is coupled to an inverter 217 that is, in turn, coupled to a compressor 219. Inverter 217 is supplied continuously with AC power and used to control compressor 219 at a selected speed in response to a signal from main control board 166, such as square wave of 0–5 V in one embodiment. As such, compressor 219 is operable at a plurality of speeds, as further explained below.

Figures 3A, 3B, 3C:
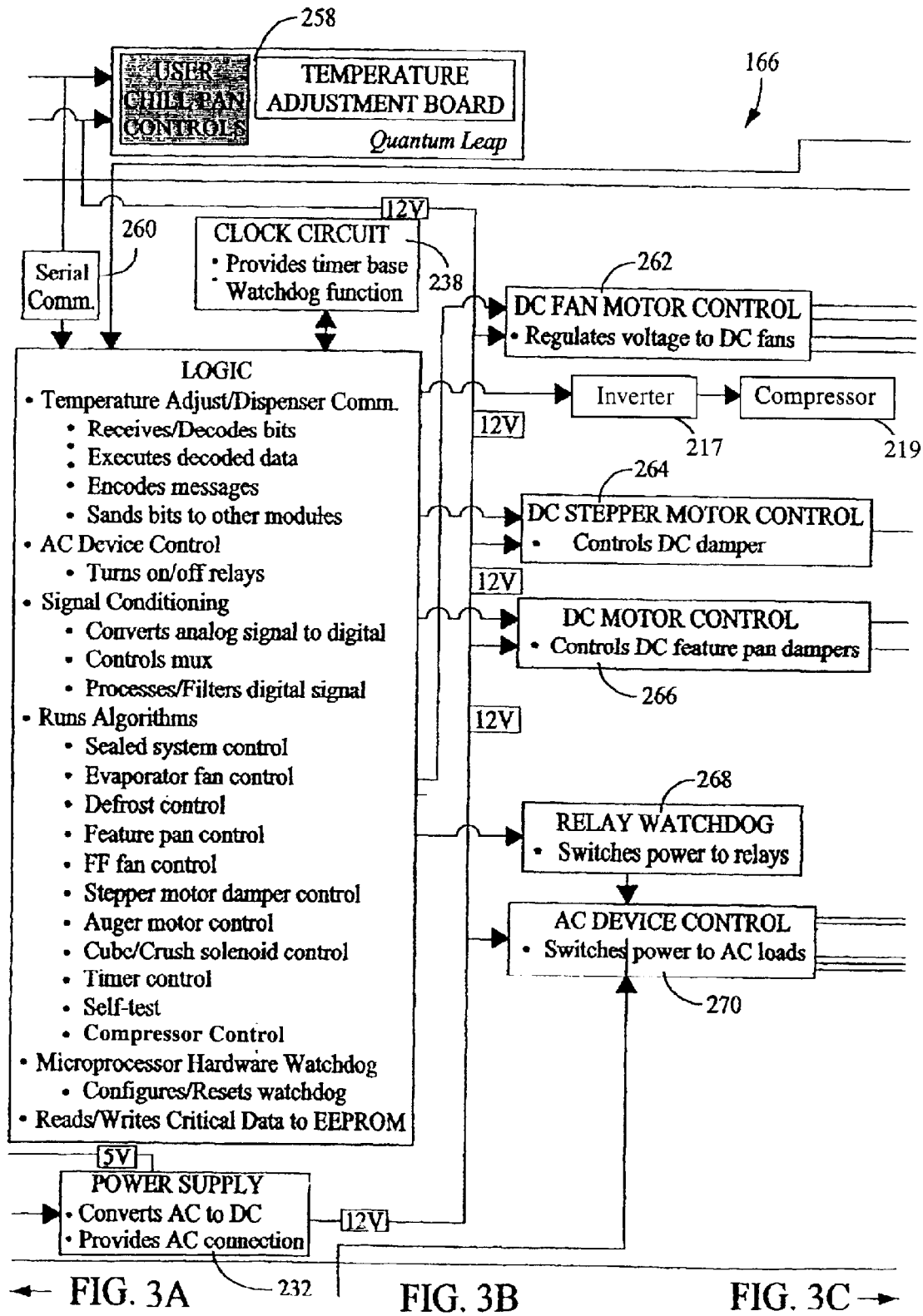
FIG. 3 is a block diagram of the main control board shown in FIG. 2.
Figure 4:
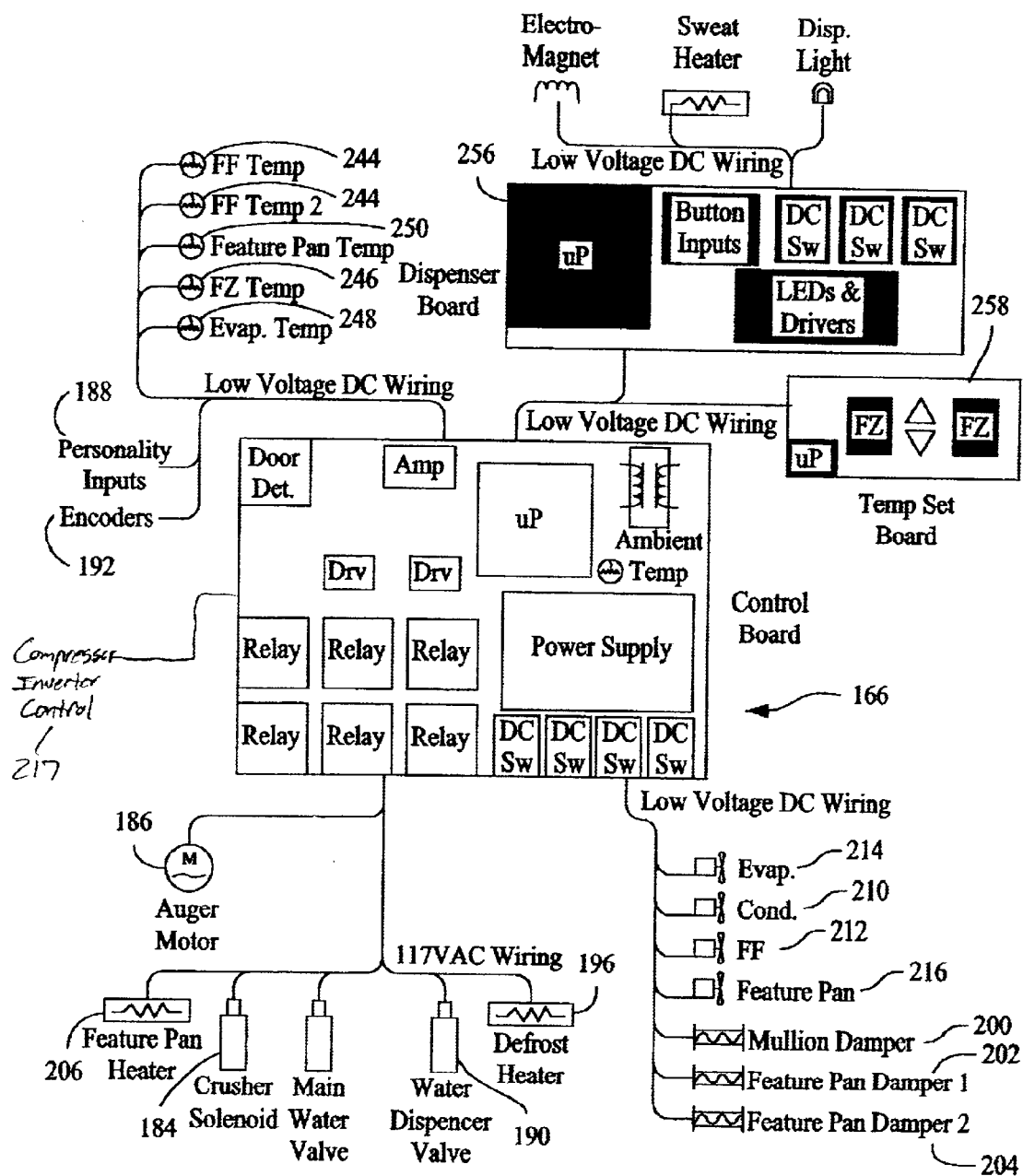
FIG. 4 is a block diagram of the main control board shown in FIG. 2.

FIGS. 3 and 4 are more detailed block diagrams of main control board 166. As shown in FIGS. 3 and 4, main control board 166 includes a processor 230. Processor 230 performs temperature adjustments/dispenser communication, AC device control, signal conditioning, microprocessor hardware watchdog, and EEPROM read/write functions. In addition, processor 230 executes many control algorithms including sealed system control, evaporator fan control, defrost control, feature pan control, fresh food fan control, stepper motor damper control, water valve control, auger motor control, cube/crush solenoid control, timer control, and self-test operations.

Processor 230 is coupled to a power supply 232 which receives an AC power signal from a line conditioning unit 234. Line conditioning unit 234 filters a line voltage which is, for example, a 90–265 Volts AC, 50/60 Hz signal. Processor 230 also is coupled to an EEPROM 236 and a clock circuit 238.

A door switch input sensor 240 is coupled to fresh food and freezer door switches 242, and senses a door switch state. A signal is supplied from door switch input sensor 240 to processor 230, in digital form, indicative of the door switch state. Fresh food thermistors 244, a freezer thermistor 246, at least one evaporator thermistor 248, a feature pan thermistor 250, and an ambient thermistor 252 are coupled to processor 230 via a sensor signal conditioner 254. Conditioner 254 receives a multiplex control signal from processor 230 and provides analog signals to processor 230 representative of the respective sensed temperatures. Processor 230 also is coupled to a dispenser board 256 and a temperature adjustment board 258 via a serial communications link 260. Conditioner 254 also calibrates the above-described thermistors 244, 246, 248, 250, and 252.

Processor 230 provides control outputs to a DC fan motor control 262, a DC stepper motor control 264, a DC motor control 266, and a relay watchdog 268. Watchdog 268 is coupled to an AC device controller 270 that provides power to AC loads, such as to water valve 190, cube/crush solenoid 184, auger motor 186, a feature pan heater 206, and defrost heater 196. DC fan motor control 266 is coupled to evaporator fan 214, condenser fan 210, fresh food fan 212, and feature pan fan 216. DC stepper motor control 266 is coupled to mullion damper 200, and DC motor control 266 is coupled to one of more sealed system dampers.

Processor logic uses many inputs to make control decisions pertaining to the present invention, including but not limited to Freezer Door State via light switch detection using optoisolators, Fresh Food Door State via light switch detection using optoisolators, Freezer Compartment Temperature via a thermistor, Evaporator Temperature via a thermistor, Compressor On Time, Time to Complete a Defrost, and User Desired Set Points via electronic keyboard and display or encoders. The electronic controls activate many loads to control refrigerator functions and operation, many of which are beyond the scope of the present invention. Those loads having some affect on the defrost functions of the refrigerator include Multi-speed or variable speed (via PWM) fresh food fan, Multi-speed (via PWM) evaporator fan, Multi-speed (via PWM) condenser fan, the Multi-speed compressor and inverter control, Defrost Relay, and Drip pan heater Relay that activate the sealed system and defrost system components.

These and other functions of the above-described electronic control system are performed under the control of firmware implemented as small independent state machines. As is described in detail below, the electronic controls facilitate an effective defrost scheme that, unlike known defrost systems, employs more than one time till time till defrost interval (normal and abnormal) between successive defrost cycles and provides a preheating function to raise a temperature of the evaporator before activating the defrost heater.

Figure 5:
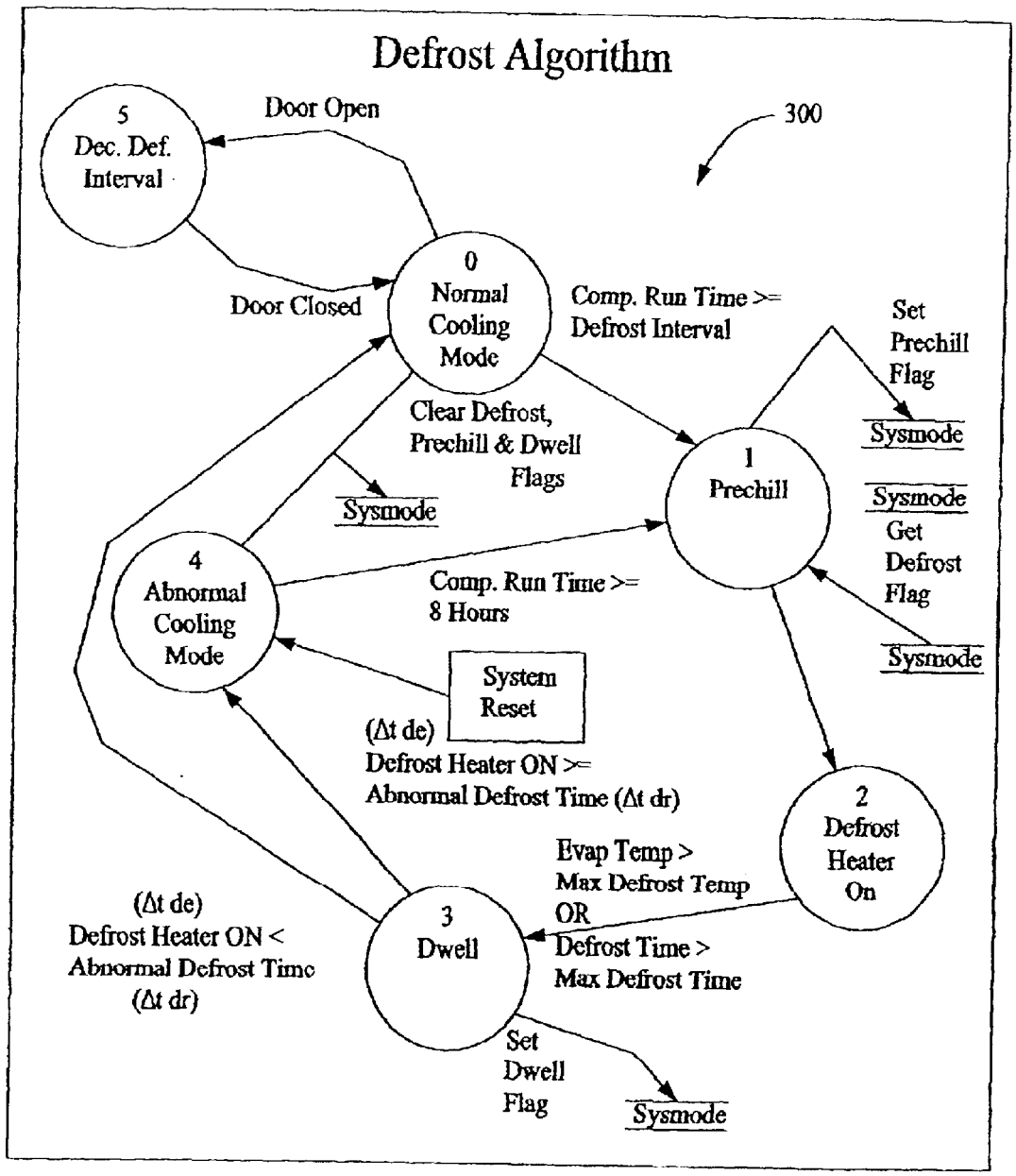
FIG. 5 is a defrost state diagram executable by a state machine of the controller shown in FIG. 2.

FIG. 5 is a defrost cycle state diagram 300 illustrating a state algorithm executable by a state machine of controller 160 (shown in FIGS. 2–4) for defrost operations. As will be seen, controller 160 adaptively determines an optimal defrost state based upon effectiveness of defrost cycles as they occur.

In an exemplary embodiment, by monitoring evaporator temperature over time, it is determined whether time till defrost intervals between successive defrost cycles are deemed "normal" or "abnormal." More specifically, when it is time to defrost, i.e. after an applicable time till time till defrost interval (explained below) has expired, the refrigerator sealed system is shut off, defrost heater 196 is turned on (at state 2), and a defrost timer is started. As the evaporator coils defrost, the temperature of the evaporator increases. When evaporator temperature reaches a predetermined termination temperature the defrost heater 196 is shut off and the elapsed time defrost heater 196 was on ($\Delta t$ de) is recorded in system memory. Also, if the termination temperature is not reached within a predetermined maximum defrost time period, defrost heater 196 is shut off and the elapsed time the defrost heater was on is recorded in system memory.

The elapsed defrost heater on time is then compared with a predetermined defrost reference time representative of, for example, an empirically determined or calculated elapsed defrost heater on time ($\Delta t$ dr) to remove a selected amount of frost buildup on the evaporator coils that is typically encountered in the applicable refrigerator platform under predetermined usage conditions. If elapsed defrost heater on time is greater than the reference defrost heater on time, thereby indicating excessive frost buildup, a first or "abnormal" time till defrost interval, or time until the next defrost cycle, is employed If elapsed defrost time is less than reference time, a second or "normal" time till defrost interval, or time until the next defrost cycle is employed that is greater than the first or abnormal time till defrost interval.

The normal and abnormal time till defrost intervals, as defined below, are selectively employed, using the reference defrost heater on time as a baseline, for more efficient defrost operation as refrigerator usage conditions change, thereby affecting frost buildup on the evaporator coils.

In one embodiment, the following control scheme automatically cycles between the first or abnormal time till defrost interval and the second or normal time till defrost interval in response to refrigerator operating conditions. When usage conditions are heavy and refrigerator doors 132, 134 (shown in FIG. 1) are opened frequently, thereby introducing more humidity into the refrigeration compartment, the system tends to execute the first or abnormal time till defrost interval repeatedly. When usage conditions are light and the doors opened infrequently, thereby introducing less humidity into the refrigeration compartments, the system tends to execute the second or normal time till defrost interval repeatedly. In intermediate usage conditions the system alternates between one or more defrost cycles at the first or abnormal time till defrost interval and one or more defrost cycles at the second or normal time till defrost interval.

Upon power up, controller 160 reads freezer thermistor 246 (shown in FIG. 3) over a predetermined period of time and averages temperature data from freezer thermistor 146 to reduce noise in the data. Periodically, controller 160 saves a current time till defrost value in system memory in the event of power loss. Controller 160 therefore recovers from brief power losses without resetting of a time till defrost counter.

If freezer temperature data indicates that freezer compartment 104 (shown in FIG. 1) is warm, i.e., at a temperature outside a normal operating range of freezer compartment, humid air is likely to be contained in freezer compartment 104, either because of a sustained power outage or opened doors during a power outage. Because of the humid air, a defrost timer is initially set to the first or abnormal time till defrost interval during pull down of the system. In one embodiment the first or abnormal time till defrost interval is set to, for example, eight hours of compressor run time. For each second of compressor run time (or for run time of any other sealed system component), the first time till defrost interval is decremented by a predetermined amount, such as one second, and the first time till defrost interval is generally unaffected by any other event, such as opening and closing of fresh food and freezer compartment doors 134, 132. In alternative embodiments, a first or abnormal time till defrost interval of greater or lesser than eight hours is employed, and decrement values of greater or lesser than one second are employed for optimal performance of a particular compressor system in a particular refrigerator platform.

When the first time till defrost interval has expired, controller 160 runs compressor 219 (see FIG. 3) for a designated pre-chill period or until a designated pre-chill temperature is reached (at state 1). Defrost heater 196 (shown in FIGS. 2–4) is energized (at state 2) to defrost the evaporator coils. Defrost heater 196 is turned on to defrost the evaporator coils either until a predetermined evaporator temperature has been reached or until a predetermined maximum defrost time has expired, and then a dwell state is entered (at state 3) wherein operation is suspended for a predetermined time period.

Upon completion of an "abnormal" defrost cycle after the first or abnormal time till defrost interval has expired, controller 160 (at state 0) sets the time till defrost to the second or normal time till defrost interval that is different from the first or abnormal time to defrost. Therefore, using the second time till defrost interval, a "normal" defrost cycle is executed. For example, in one embodiment, the second time till defrost interval is set to about 60 hours of compressor run time. In alternative embodiments, a second time till defrost interval of greater or lesser than 60 hours is employed to accommodate different refrigerator platforms, e.g., top-mount versus side-by-side refrigerators or refrigerators of varying cabinet size.

In one embodiment, the second time till defrost interval, unlike the first time till defrost interval, is decremented (at state 5) upon the occurrence of any one of several decrement events. For example, the second time till defrost interval is decremented (at state 5) by, for example, one second for each second of compressor run time, or for run time of any other sealed system component. In addition, the second time till defrost interval is decremented by a predetermined amount, e.g., 143 seconds, for every second freezer door 132 (shown in FIG. 1) is open as determined by a freezer door switch or sensor 242 (shown in FIG. 3). Finally, the second time till defrost interval is decremented by a predetermined amount, such as 143 seconds in an exemplary embodiment, for every second fresh food door 134 (shown in FIG. 1) is open. In an alternative embodiment, greater or lesser decrement amounts are employed in place of the above-described one second decrement for each second of compressor run time and 143 second decrement per second of door opening. In a further alternative embodiment, the decrement values per unit time of opening of doors 132, 134 are unequal for respective door open events. In further alternative embodiments, greater or fewer than three decrement events are employed to accommodate refrigerators and refrigerator appliances having greater or fewer numbers of doors and to accommodate various compressor systems and speeds.

When the second or normal time till defrost interval has expired, controller 160 runs compressor 219 for a designated pre-chill period or until a designated pre-chill temperature is reached (at state 1). Defrost heater 196 is energized (at state 2) to defrost the evaporator coils. Defrost heater 196 is turned on to defrost the evaporator coils either until a predetermined evaporator temperature has been reached or until a predetermined maximum defrost time has expired. Defrost heater 196 is then shut off and the elapsed defrost heater on time ($\Delta t$ de) is recorded in system memory. A dwell state is then entered (at state 3) wherein sealed system operation is suspended for a predetermined time period.

The elapsed defrost heater on time is then compared with a predetermined reference defrost heater on time ($\Delta t$ dr). If the elapsed defrost heater on time is greater than the reference defrost heater on time, thereby indicating excessive frost buildup, the first or abnormal time till defrost interval is employed for the next defrost cycle If the elapsed defrost heater on time is less than the reference defrost heater on time, the second or normal time till defrost interval is employed for the next defrost cycle. The applicable time till defrost interval is applied and a defrost cycle is executed when the time till defrost interval expires. The elapsed defrost heater on time of the cycle is recorded and compared to the reference defrost heater on time to determine the applicable time till defrost interval for the next cycle, and the process continues. Normal and abnormal time till defrost intervals are therefore selectively employed on demand in response to changing refrigerator conditions.

It is recognized that that other known reference data may be employed in lieu of elapsed defrost time as indicative of evaporator frost buildup to distinguish between "normal" and "abnormal" defrost cycles. For example, compressor and evaporator loads may be monitored to determine effectiveness of the sealed system due frost buildup on the evaporator coils, and pressure and temperature sensors may be employed on the evaporator and/or compressor to sense performance parameters and changes over time that are indicative of defrost effectiveness. In addition, other reference values, such as elapsed time to cool a refrigeration compartment to a given temperature, or total elapsed door-open time may be employed to evaluate and demarcate a need for a normal or abnormal defrost cycle.

Figure 6:
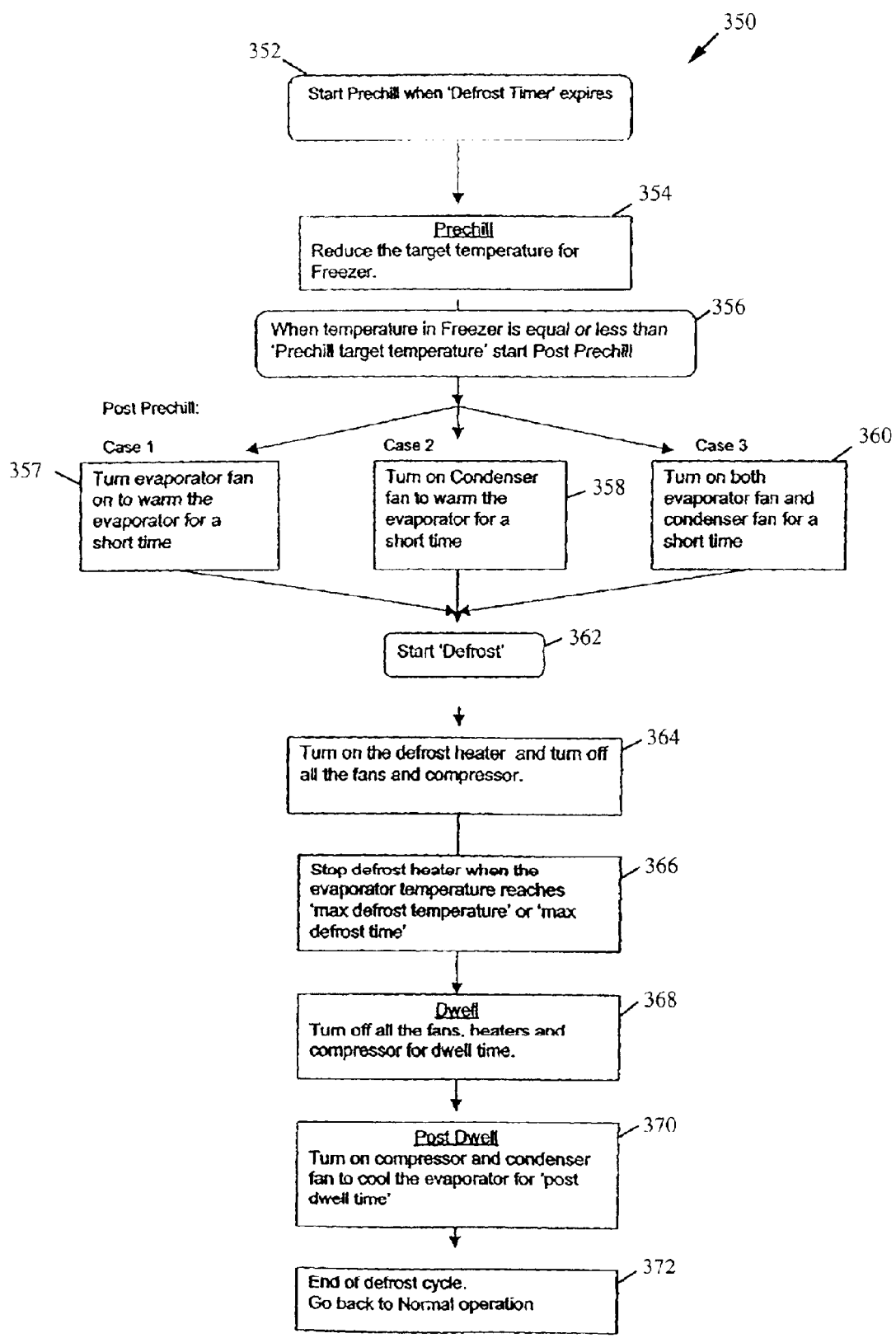
FIG. 6 is a method flow chart of an adaptive defrost algorithm executable by the controller shown in FIG. 2.

FIG. 6 is a method flow chart of an adaptive defrost method algorithm 350 executable by controller 160 (shown in FIG. 2) for energy efficient defrost while minimizing the effect on freezer compartment temperature during defrost operations.

Algorithm 350 begins by starting 352 prechill operations when the applicable time till defrost interval (described above in relation to FIG. 5) expires. Thus, the refrigerator sealed system is activated 354 to prechill freezer compartment 104 (shown in FIG. 1) and lower freezer compartment temperature to a prechill target temperature well below a normal target temperature determined by user-selected setpoints. Prechilling functions may be activated for a predetermined time, such as two hours in an exemplary embodiment, or until a designated temperature is reached. In the prechilling process, a surface temperature of evaporator 215 (shown in FIG. 3) is lowered to a low temperature. When freezer compartment temperature is equal to or less than the prechill target temperature, as determined by freezer thermistor 244 (shown in FIG. 3), a post prechill operation is commenced 356.

In the post prechill operation the temperature of evaporator 215 (shown in FIG. 3) is raised from the low surface temperature at the completion of the prechill operation through selective activation of sealed system components prior to activating defrost heater 196 (shown in FIG. 3). By activating defrost heater 196 after surface temperature of evaporator 215 has been raised, defrost heater 196 may be activated for less time (i.e., defrost heater on time is decreased) and with less energy to defrost evaporator 215, thereby shortening a defrost cycle time while consuming less energy. Also, the decreased heater on time produces less heat from the defrost heater that may affect refrigeration compartment temperatures.

As illustrated in FIG. 6, post prechill operations to increase evaporator surface temperature and reduce defrost cycle time and energy dissipated from defrost heater 196 may be accomplished in several ways. For example, evaporator fan 214 (shown in FIG. 2) may be activated 356 with a remainder of sealed system components (i.e., the compressor and other fans) deactivated. Running of evaporator fan 214 in such a circumstances transfers heat from evaporator 215 and warms evaporator 215. As such the evaporator temperature is preheated prior to turning on the defrost heater, and less energy is expended by the defrost heater to defrost the evaporator coils. In different embodiments, evaporator fan 214 may be run for a predetermined time period, until a predetermined evaporator temperature is reached or for a variable period dependant upon other sensed conditions of the refrigerator system, such as a temperature difference between fresh food compartment 102 (shown in FIG. 1) and freezer compartment 104 (shown in FIG. 1).

In an alternative post prechill operation, condenser fan 210 (shown in FIG. 2) may be activated 358 with a remainder of the sealed system components (i.e., compressor 219 and other fans) shut off. Running of condenser fan 210 in such circumstances intensifies evaporation of refrigerant in condenser 211 (shown in FIG. 3) and acts as a thermal siphon causing migration of refrigerant to evaporator 215. Condensing of vapor refrigerant in evaporator 215 rejects heat to the evaporator surface thereby warming evaporator 215. As such the evaporator temperature is preheated prior to turning on the defrost heater, and less energy is expended by the defrost heater to defrost the evaporator coils. In addition, running of only condenser fan 210 prior to defrost has an added benefit of reducing pressure imbalance of the sealed system for restarting of the sealed system after the defrost cycle is completed. As such, both defrost heater on time and sealed system dwell time may be shortened by running only condenser fan 210 prior to energizing defrost heater 196.

In still another alternative post prechill operation, evaporator fan 214 and condenser fan 210 are both activated 360 with a remainder of the sealed system components deactivated. Thus, the effects of post prechill operations 356, 358 are combined to raise a temperature of evaporator 215. As such the evaporator temperature is preheated prior to turning on the defrost heater, and less energy is expended by the defrost heater to defrost the evaporator coils. Additionally, with appropriate positioning of a damper, activating 360 evaporator fan 214 and condenser fan 210 continues to introduce cold air into freezer compartment 104.

Post prechill operations 356, 358, 360 are initiated for a predetermined time to raise evaporator temperature, or alternatively, evaporator temperature may be monitored with evaporator thermistor 248 (shown in FIG. 3). Termination temperatures and/or appropriate time periods may be empirically determined for particular refrigeration systems or calculated according to known heat transfer relationships between sealed system components.

When post prechill operations are completed and evaporator temperature is consequently raised above the evaporator temperature upon completion of pre-chill operations, defrost operations are started 362. Defrost heater 196 is therefore energized 360 and the sealed system (i.e., all the fans and the compressor) is deactivated. In an alternative embodiment, condenser fan 210 continues to run for some or all of the defrost heater on time.

Defrost heater 196 remains energized and continues to heat evaporator 215 to remove frost therefrom until either a maximum defrost time expires or until a designated defrost termination temperature is reached 366 as determined by evaporator thermistor 248 (shown in FIG. 3). At this point, defrost heater 196 is deactivated and the sealed system enters 368 a dwell state of no activity wherein the sealed system is completely off for a predetermined time period such that system pressure may be stabilized.

When the dwell period has expired, a post dwell period is entered 370 wherein compressor 219 and condenser fan 210 are operated with a remainder of the sealed system components deactivated. As such, compressor 219 and condenser fan 210 are operated to pull down the temperature of evaporator 214 and prepare the sealed system for normal operation. In an exemplary embodiment, compressor 219 and/or condenser fan 210 are activated in a low speed when the dwell period expires. When evaporator temperature is lowered to a predetermined level or until a predetermined time period has expired, the defrost cycle ends 372 and controller 160 returns to normal operation of refrigerator 100, including running compressor 219 and condenser fan 210 at other speeds.

While the invention has been described in terms of various specific embodiments, those skilled in the art will recognize that the invention can be practiced with modification within the spirit and scope of the claims.

What is claimed is:

1. A method for defrosting an evaporator of a refrigeration sealed system, the system including a controller said method comprising:

operatively coupling the controller to an evaporator fan, a condenser fan and a defrost heater;

operating the scaled system until a selected time till defrost interval expires;

initiating a defrost cycle when the time till defrost interval expires; and selectively operating the sealed system to raise a temperature of the evaporator while the defrost heater is inactivated.

2. A method in accordance with claim 1 wherein selectively operating the sealed system comprises running the evaporator fan only.

3. A method in accordance with claim 1 wherein selectively operating the sealed system comprises running the condenser fan only.

4. A method in accordance with claim 1 wherein selectively operating the sealed system comprises running the evaporator fan and the condenser fan only.

5. A method bar defrosting a refrigeration appliance including a freezer compartment and a sealed system, the system including a controller the method utilizing a defrost heater, said method comprising:

operatively coupling the controller to an evaporator, an evaporator fan, a compressor, a condenser, a condenser fan, and the defrost heater;

operating the sealed system until a selected time till defrost interval expires;

initiating a defrost cycle when the time till defrost interval expires;

operating the sealed system to prechill the refrigeration compartment;

selectively operating the sealed system to raise a temperature of the evaporator; and energizing the defrost heater after selectively operating the sealed system to raise a temperature of the evaporator.

6. A method in accordance with claim 5 wherein selectively operating the sealed system comprises running only the evaporator fan.

7. A method in accordance with claim 5 in selectively operating the sealed system comprises running only the condenser fan.

8. A method in accordance with claim 5 wherein selectively operating the sealed system comprises running the evaporator fan and the condenser fan.

9. A method in accordance with claim 5 further comprising:

defrosting the evaporator with the defrost heater;

suspending operation of the sealed system for a predetermined dwell time; and activating the compressor and the condenser to lower a temperature of the evaporator.

10. A refrigeration unit comprising:

a compressor;

an evaporator;

a condenser fan;

a defrost heater; and a controller, said controller operatively coupled to said compressor, said evaporator and said defrost heater, said controller comprising a defrost tinier and configured to operate said compressor in a normal mode and an abnormal load in response to a value of the defrost timer, and said controller further configured to selectively operate at least one of said evaporator fan and said condenser fan when said time till defrost interval expires to raise a temperature of the evaporator before energizing said defrost heater.

11. A refrigeration unit in accordance with claim 10, said controller further configured to energize said defrost heater to warm the evaporator and configured to operate the compressor and condenser fan to lower the temperature of the evaporator after the evaporator is warmed.

12. A refrigerator comprising:

a cabinet defining at least one refrigeration compartment;

a sealed system for cooling said at least one refrigeration compartment, said sealed system comprising an evaporator;

a defrost heater; and a controller operatively coupled to said sealed system and to the defrost heaters, said controller configured to adaptively control said defrost heater and said sealed system between normal and abnormal time till defrost intervals, and when a time till defrost interval has expired, said controller is configured to:

operate said sealed system to prechill said refrigeration compartment and to thereafter selectively operate said scaled system to raise a temperature of said evaporator without energizing said defrost heater.

13. A refrigerator in accordance with claim 12 further comprising at least one refrigeration compartment door, said controller configured to operate said sealed system for normal and abnormal intervals based upon a number of openings of said compartment door.

14. A refrigerator in accordance with claim 12 wherein said controller is configured to operate at least one of said fans with said compressor deactivated to raise a temperature of said evaporator.

15. A refrigerator in accordance with claim 12 said controller further configured to operate only said compressor and said condenser fan to lower a temperature of said evaporator after said defrost heater has been energized.

* * * * *

UNITED STATES PATENT AND TRADEMARK OFFICE
CERTIFICATE OF CORRECTION

PATENT NO. : 6,817,195 B2
APPLICATION NO. : 10/113892
DATED : November 16, 2004
INVENTOR(S) : Rafalovich et al.

It is certified that error appears in the above-identified patent and that said Letters Patent is hereby corrected as shown below:

In Claim 1, column 11, line 9, delete "scaled" and insert therefor -- sealed --.

In Claim 5, column 11, line 26, delete "method bar" and insert therefor -- method for--.

In Claim 10, column 12, line 13, delete "tinier" and insert therefor -- timer --.

In Claim 12, column 12, line 40, delete "scaled" and insert therefor -- sealed --.

Signed and Sealed this

Fifth Day of September, 2006

JON W. DUDAS
*Director of the United States Patent and Trademark Office*